US007221270B2

(12) United States Patent
Chen et al.

(10) Patent No.: US 7,221,270 B2
(45) Date of Patent: May 22, 2007

(54) TEMPERATURE TRACKING AND MONITORING SYSTEM USED FOR COMMODITIES TRANSPORTATION

(75) Inventors: Hui-Chuan Chen, Hsinchu (TW); Ming-Li Wang, Taoyuan (TW); Hong-Ming Kuo, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 198 days.

(21) Appl. No.: 11/115,109

(22) Filed: Apr. 27, 2005

(65) Prior Publication Data
US 2006/0145844 A1    Jul. 6, 2006

(30) Foreign Application Priority Data
Dec. 23, 2004    (TW) ............................. 93140202 A

(51) Int. Cl.
  *G08B 1/08*    (2006.01)
  *G08C 19/12*   (2006.01)
(52) U.S. Cl. ..................... 340/539.13; 340/870.17; 340/425.5; 340/449; 340/539.27; 340/572.1; 340/588; 702/130; 235/384
(58) Field of Classification Search ........... 340/539.13, 340/449, 584, 588
See application file for complete search history.

(56) References Cited
U.S. PATENT DOCUMENTS
6,687,609 B2 * 2/2004 Hsiao et al. ................ 701/207

| 6,847,912 B2 * | 1/2005 | Forster ........................ 702/130 |
| 7,015,826 B1 * | 3/2006 | Chan et al. ............. 340/870.17 |
| 2003/0006907 A1 * | 1/2003 | Lovegreen et al. .... 340/870.16 |
| 2005/0073406 A1 * | 4/2005 | Easley et al. ............. 340/539.1 |
| 2005/0203683 A1 * | 9/2005 | Olsen et al. .................. 701/35 |
| 2005/0248454 A1 * | 11/2005 | Hanson et al. ......... 340/539.26 |

* cited by examiner

*Primary Examiner*—Donnie L. Crosland
(74) *Attorney, Agent, or Firm*—Troxell Law Office, PLLC

(57) ABSTRACT

A temperature tracking and monitoring system used for commodities transportation comprises a deliver unit, a control computer and a monitor and control unit. The deliver unit comprises a transportation means, at least a glove compartment, a RFID tag and a RFID reader. The glove compartment is disposed in the transportation device the RFID tag is disposed in the glove compartment and has provision for transmitting an identification code. The control computer is adapted to communicate with the RFID reader to receive a temperature signal and the identification code. The control computer transmits a positioning request signal, receives real-time position data, transforms the real-time position data into a position signal and transmitting the position signal, the temperature signal and the identification code in a specific manner. The monitor and control portion comprises a positioning device and a logistics center. The positioning device transmits the real-time position data to the control computer in response to the positioning request signal. The logistics center receives the position signal, the temperature signal and the identification code so as to acquire information of a position and a temperature of the glove compartment reading content of a local message.

20 Claims, 3 Drawing Sheets

TEMPERATURE TRACKING AND MONITORING SYSTEM USED FOR COMMODITIES TRANSPORTATION

FIELD OF INVENTION

The present invention relates to a tracking and monitoring system and particularly to a temperature tracking and monitoring system used for commodities transportation undertaken with the help of radio frequency identification (RFID) and global positioning system (GPS).

BACKGROUND OF THE INVENTION

Cargo may be transported by a variety of methods dependent on cost, transportation plan and pick-up and drop-off locations. Furthermore, if the commodities are perishable or fragile, additional shipping precautions may be required.

In a normal cargo transportation process, current locations and conditions of the transported cargo are hard to be perceived. In this situation, a multitude of communication methods are generally suggested to be provided among transportation means and transportation companies associated with the cargo transportation, such as mobile phone communications, facsimiling, emailing and other suitable and practicable methods. In the cargo warehouses, wharf storehouses and airport storehouses, manual management is still adopted and thus high cost and consuming labor are required.

To resolve this problem, many techniques have been set forth. For example, U.S. Pat. No. 6,704,626 disclosed "Logistics system and method with position control", in which logistics system and method are mounted and applied on a vehicle and utilize vehicle position control for the logistics operations, such as loading and unloading material to and from the vehicle, in which the position control can be global positioning system (GPS)-based and/or based on linear movement of the vehicle, such as movement of a railcar along a rail track. Namely, the GPS is relied on to achieve the management of vehicle cargo positions and cargo import and export.

U.S. Pat. No. 6,429,810 disclosed "Integrated air logistics system", in which satellite system position information is used for GPS for use of cargo trucks. By means of this method, a truck position may be unidirectionally passed to a receiver of the cargo or a container position may be directed to the receiver through a ground system. Further, tracking and management of the cargo serviced with the logistics system are achieved by positioning and communication modules of the GPS.

U.S. Pat. No. 3,961,323 set forth "Cargo monitor apparatus and method", in which a miniature communication device and an antenna are placed on a container and a frequency of 27 MHz is adopted for communication with a communication receiver located nearby through the antenna so that the container may be assured with no movement of the container occurred. As such, the container may be well managed and protected from thefts.

However, none of the above prior arts provides an efficient management with respect to cargo import and export and may acquire real-time cargo temperature and position information.

SUMMARY OF THE INVENTION

It is, therefore, an object of the present invention to provide a temperature tracking and monitoring system used for commodities transportation in which a radio frequency identification (RFID) tag is used as a serial number of a transported commodities so as to efficiently achieve management and control of the transported commodities.

It is another object to provide a temperature tracking and monitoring system used for commodities transportation in which a RFID tag is used for detection of temperature of a transportation means or a glove compartment so that transported commodities stored in the transportation means or glove compartment may be kept in a fresh state.

It is yet another object of the present invention to provide a multi-temperature commodities tracking and monitoring system used for commodities transportation, in which global positioning system (GPS) is employed in cooperation so that a purpose of transportation means or glove compartment tracking may be efficiently achieved.

To achieve the above objects, the temperature tracking and monitoring system used for commodities transportation comprises a deliver unit, a control computer and a monitor and control unit. The deliver unit comprises a transportation means, at least a glove compartment, a RFID tag and a RFID reader. The glove compartment is disposed in the transportation means. The RFID tag is disposed in the glove compartment and has provision for transmitting an identification code. The control computer is adapted to communicate with the RFID reader to receive a temperature signal and the identification code. The control computer transmits a positioning request signal, receives real-time position data, transforms the real-time position data into a position signal and transmitting the position signal, the temperature signal and the identification code in a specific manner. The monitor and control unit comprises a positioning device and a logistics center. The positioning device transmits the real-time position data to the control computer in response to the positioning request signal. The logistics center receives the position signal, the temperature signal and the identification code so as to acquire information of a position and a temperature of the glove compartment.

To achieve the above objects, the method of tracking and monitoring multi-temperature commodities, comprising the steps of: (a) providing a deliver unit, a control computer and a monitor and control unit wherein the deliver unit includes a transportation means, a glove compartment, a RFID tag with an identification code and a RFID reader and the monitor and control unit includes a positioning device and a logistics center; (b) placing the RFID tag into the glove compartment and then placing the glove compartment, the RFID reader and the control computer into the transportation means and at the same time connecting communicatively the control computer with the RFID reader; (c) initializing the control computer and the RFID reader; (d) starting off the cargo truck and beginning a distribution task from the logistics center; (e) detecting a temperature by the RFID tag instructed by the control computer through the RFID reader, transforming the detected temperature into a temperature signal, transmitting the temperature signal, reading the identification code through the RFID reader by the control computer and at the same time transmitting a positioning request signal to the positioning device by the control computer, transmitting real-time position data in response by the positioning device to the control computer and transforming the real-time position data into a position signal; (f) transmitting the temperature signal, the position signal and the identification signal in a specific manner to the logistics center; (g) displaying the temperature signal, the position signal and the identification code by the logistics center so that real-time conditions of the transportation means are acquired; (h) determining if the transportation means has reached the client terminal by the logistics center, directing, if yes, the transported commodity to the client terminal, yet repeating the step (e); (j) generating a signal as to finished transportation and transmitting the signal as to finished transportation to the logistics center in a specific manner; (k) displaying information as to finished transportation by the logistics center; and (l) returning of the cargo truck to the logistics center.

Preferably, the monitor and control unit further comprises a telecommunications company which is capable of receiving the position signal, the temperature signal and the identification code transmitted from the control computer and forwarding the position signal, the temperature signal and the identification code to the logistics center.

Preferably, the position signal, the temperature signal and the identification code are forwarded to the logistics center through the Internet.

Preferably, the glove compartment further comprise a fixation device comprising an upper lid and a lower lid. The upper lid is hollow and provided with a plurality of through-holes. An end of the upper lid is closed and another end of the upper lid is provided with a first tenon. The closed end is provided with a first rotation fixation bolt which may be coupled to the glove compartment. The lower lid is hollow and has a plurality of through-holes. An end of the lower lid is closed and another end of the lower lid is provided with a second tenon which may be fastened to the first tenon and a second rotation fixation device. Through a connection between the first and second rotation fixation bolts and the glove compartments, the fixation device is fixed in the glove compartments.

Preferably, the RFID tag is disposed in the fixation device.

Preferably, the RFID tag is an active RFID tag.

Preferably, the specific manner may be GPS transmission, universal grouping wireless business transmission, wireless transmission, and 3G wireless communications transmission.

Preferably, the positioning device is a GPS satellite.

Preferably, the RFID tag is adapted to detect temperatures based on a specific time interval.

Preferably, the delivery unit further comprises an alarm device coupled communicatively to the control computer and is configured to set forth an alarm sound.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
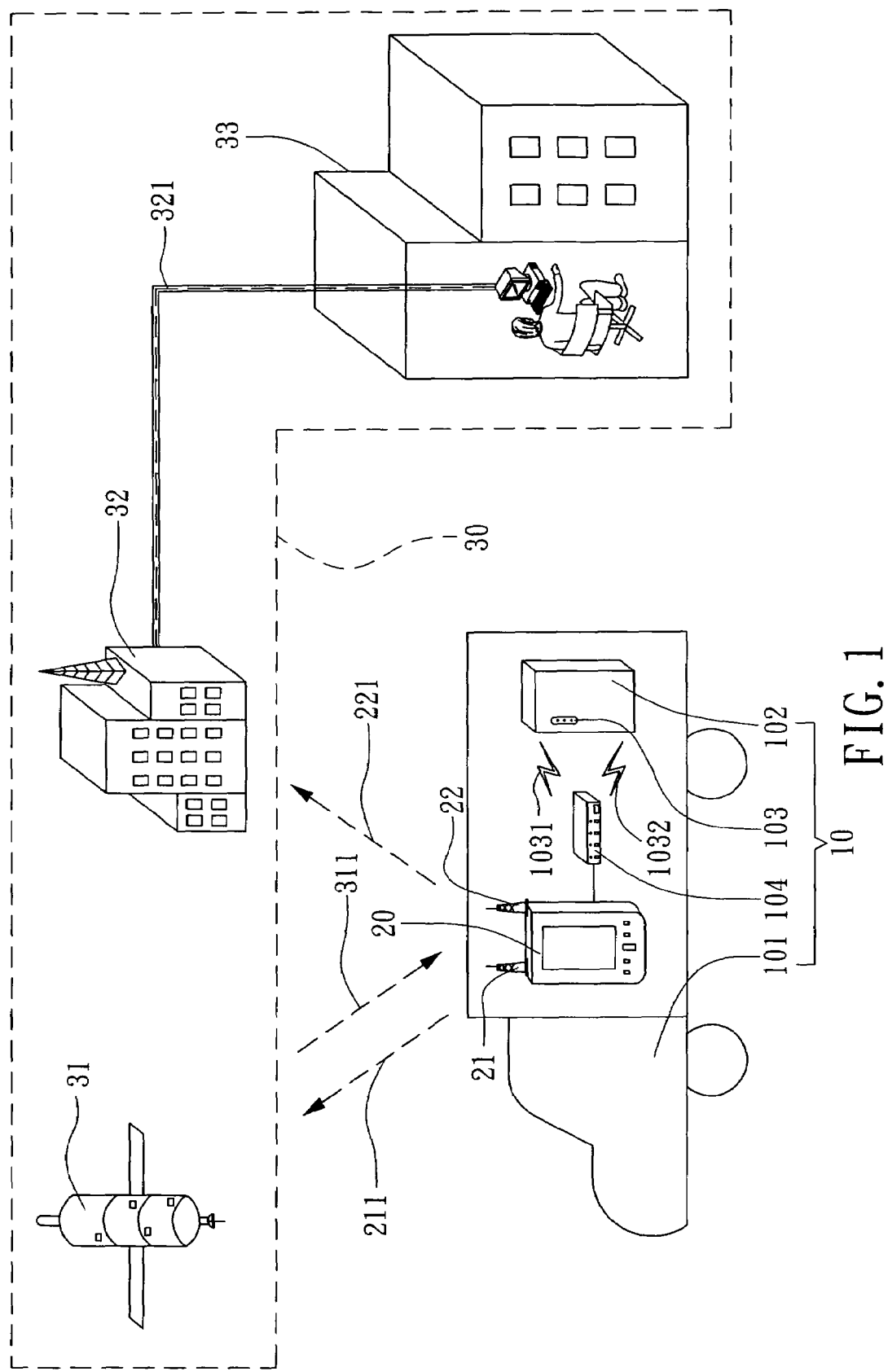
FIG. 1 is a schematic diagram depicting a temperature tracking and monitoring system according to the present invention.

Referring to FIG. 1, a schematic diagram depicting a temperature tracking and monitoring system used for cargo transportation according to the present invention is shown therein. The temperature track and monitor system comprises a deliver unit 10, a control computer 20 and a monitor and control unit 30. The delivery unit 10 comprises a transportation vehicle 101, a glove compartment 102, a RFID tag 103 and a RFID reader 104. The glove compartment 102 is disposed in the transportation vehicle 101, the RFID tag 103 is disposed in the glove compartment 102 and transmits an identification code 1032. The FRID tag 103 is adapted to detect a temperature and transform the temperature into a temperature signal 1031. The RFID reader 104 is disposed in the transportation vehicle 101 and adapted to read the temperature signal 1031 and the identification code 1032.

The control computer 20 is coupled communicatively with the RFID reader 104 to receive the temperature signal 1031 and the identification code 1032. The monitor and control unit 30 comprises a global positioning system (GPS) satellite 31, a telecommunications company 32 and a logistics center 33.

In this embodiment, the control computer 20 is provided with a GPS module (not shown) and an antenna 21 therefor. Also, a wireless communications module (not shown) and an antenna 22 therefor are provided. As such, the control computer 20 may transmit a positioning request signal 211 to the GPS satellite 31 through the antenna 21 and receive real-time position data transmitted from the GPS satellite 31. In response, the control computer 20 transforms the real-time position data 311 into a position signal (now shown). Then, the position signal, the temperature signal 1031 and the identification code 1032 are combined to form a logistics signal 221 and the logistics signal 221 is then directed to the telecommunications company 32.

Between the telecommunications company 32 and the logistics center 33, the Internet 321 is provided. When received by the telecommunications company 32, the logistics signal 221 is transmitted to the logistics center 33 through the Internet 321. Once received by the logistics center 33, the logistics signal 221 is transformed into information associated with merchandise type, position, and temperature (not shown) so that real-time conditions of the glove compartment 102 may be acquired at the logistics center 33.

Figure 2:
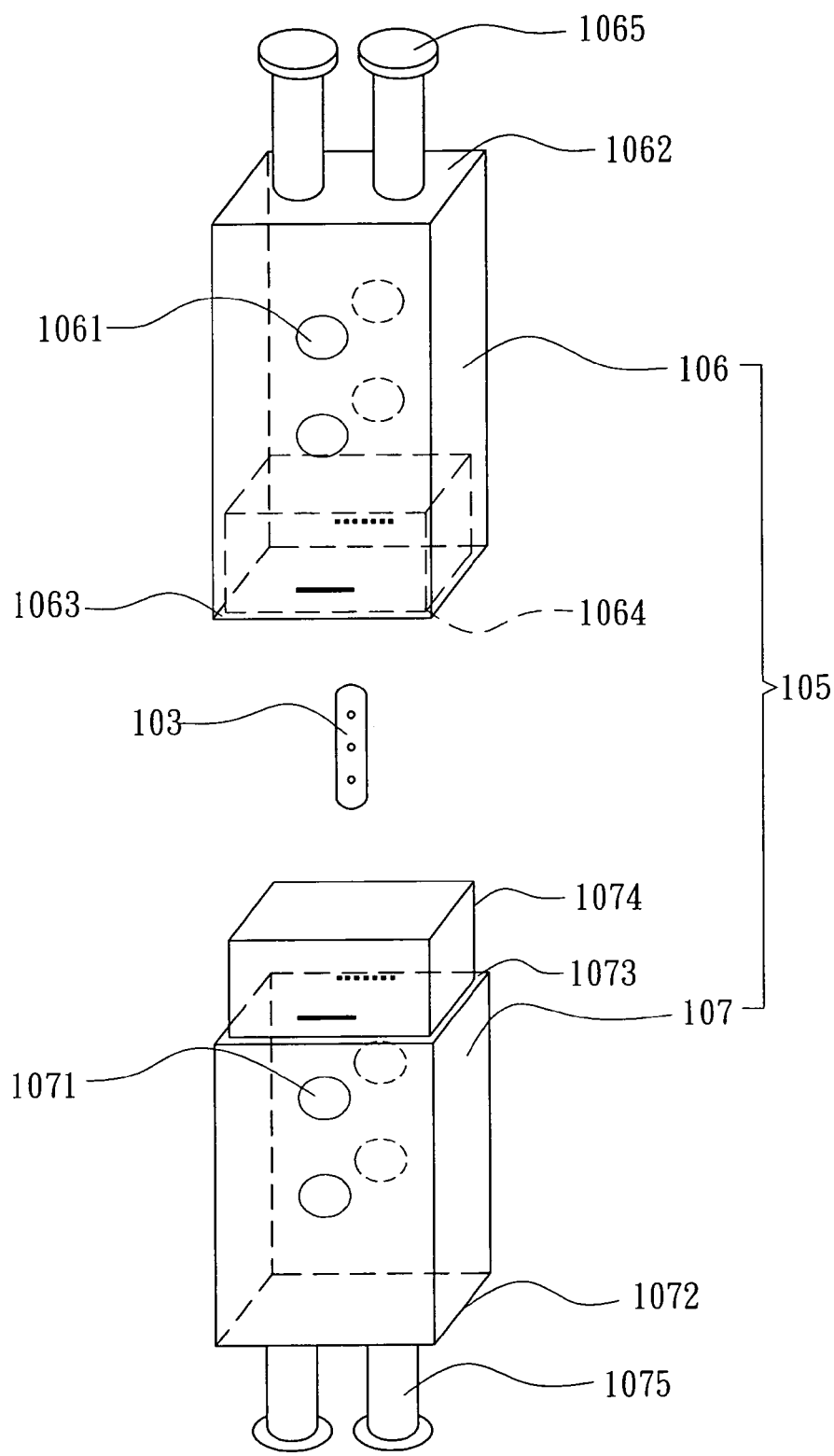
FIG. 2 is a schematic diagram of a fixation device used in the temperature tracking and monitoring system according to the present invention.

Referring to FIG. 2, the glove compartment 102 comprises a fixation device 105 having an upper lid 106 and a lower lid 107. The upper lid 106 is hollow and has a plurality of through-holes 1061. An end 1062 of the upper lid 106 is closed and another end 1063 of the upper lid 106 is provided with a first tenon 1064. The closed end 1062 is provided with a first rotation fixation bolt 1065 which may be coupled to the glove compartment 102. The lower lid 107 is hollow and has a plurality of through-holes 1071. An end 1072 of the lower lid 107 is closed and another end 1073 of the lower lid 107 is provided with a second tenon 1074 which may be fastened to the first tenon 1064 so that the RFID tag 103 may be placed in the fixation device 105. The closed end 1072 is provided with a second rotation fixation bolt 1075 and may also be coupled to the glove compartment 102. By means of the connections between the first and second rotation fixation bolt 1065,1075 and the glove compartment 102, the fixation device 105 may be locked and fixed in the glove compartment 102. As such, the RFID tag 103 may be exempted from contact with goods (e.g. fresh seafood) in the glove compartment 102 and thus the transported commodities may not be polluted.

Figure 3:
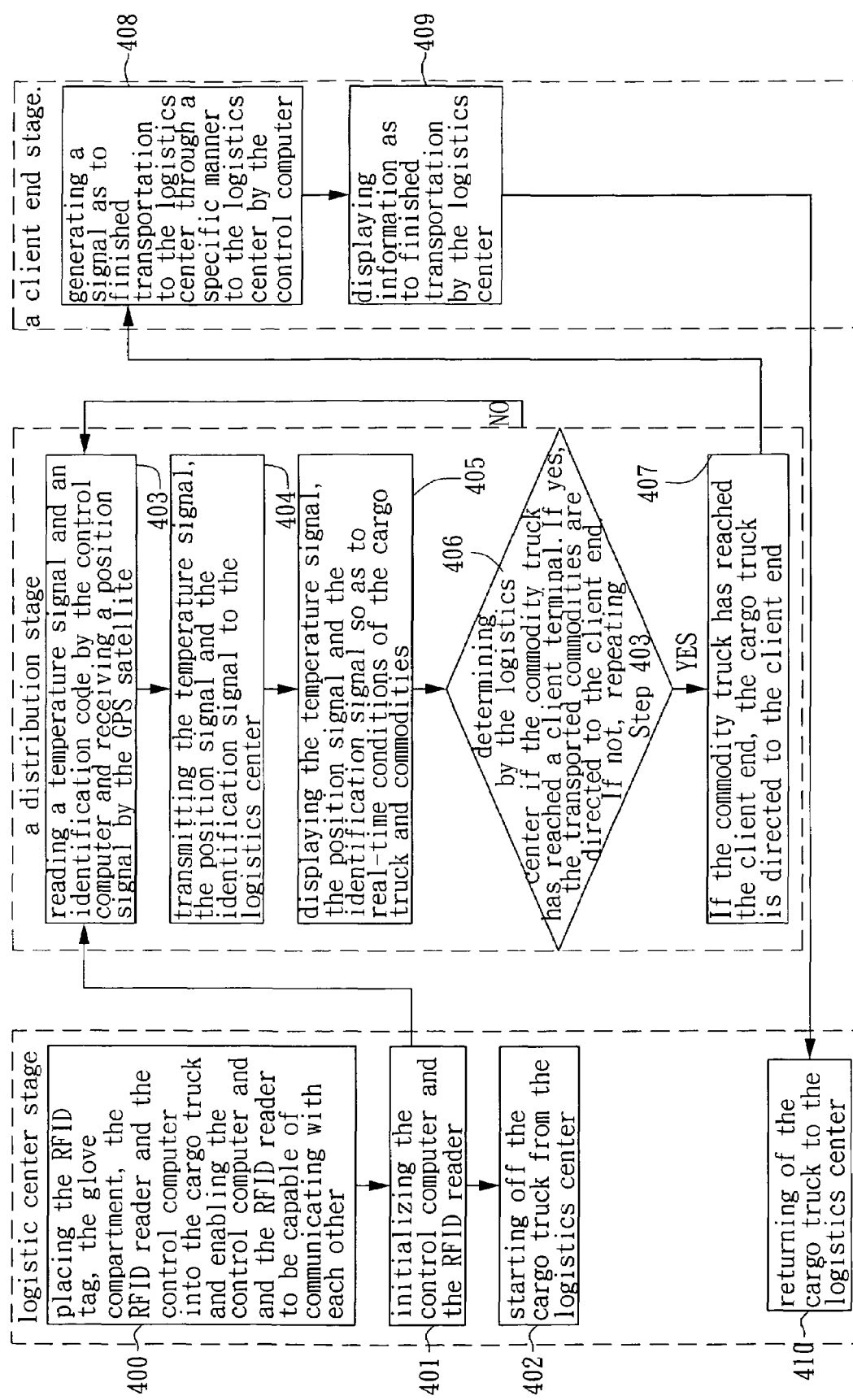
FIG. 3 is a flowchart illustrating a multi-temperature commodities tracking and monitoring method according to the present invention.

FIG. 3 shows a flowchart depicting a method of tracking and monitoring multi-temperature commodities. The method may be classified into three main stages, including a logistic center stage, a distribution stage and a client end stage.

Step 400: placing the RFID tag, the glove compartment, the RFID reader and the control computer into the cargo truck and enabling the control computer and the RFID reader to be capable of communicating with each other. In this step, the RFID tag is required to be first placed into the glove compartment and then the glove compartment, the RFID reader and the control computer are placed into the cargo truck. Alternatively, the RFID tag may be first placed a fixation device as shown in FIG. 2 and then the fixation device is locked into the glove compartment. The RFID tag has an identification code and is capable of detecting a temperature. Through the identification code, the logistics center may identify type of the transported goods.

Step 401: initializing the control computer and the RFID reader. In this step, the control computer may set a read time period (e.g. 5 minutes) so that the RFID tag is not required to read and transmit a signal at any time and thus electricity required for the RFID may be saved (battery life may also be prolonged). Meanwhile, GPS signals may also be confirmed and corrected and communications between the control computer and the logistics system may be tested.

Step 402: starting off the cargo truck from the logistics center;

Step 403: reading a temperature signal and an identification code by the control computer and receiving a position signal by the GPS satellite. In this step, the control computer reads the identification code of the RFID tag and the detected temperature. Meanwhile, the control computer transmits a positioning request signal to the GPS satellite. In response, the GPS satellite transmits real-time position data to the control computer and the control computer then transforms the real-time position data into the position signal.

Step 404: transmitting the temperature signal, the position signal and the identification signal to the logistics center. In this step, the control computer transmits the temperature signal, the position signal and the identification code in a specific manner to the telecommunications company. Then, the telecommunications company transmits the received signals to the logistics center through the Internet or a specific manner. Specifically, the specific manner may be GPS transmission, universal grouping wireless business transmission, wireless transmission and 3G wireless communications transmission.

In step 405, displaying the temperature signal, the position signal and the identification signal so as to real-time conditions of the cargo truck and commodities. In this step, the temperature signal, the position signal and the identification signal may be displayed on an electronic map in such a manner that the logistics center may easily acquire a position of the cargo truck and thus efficiently control and mange the cargo truck and commodities.

Step 406: determining by the logistics center if the commodity truck has reached a client end. If yes, the transported commodities are directed to the client end. If not, repeating Step 403. In this step, the logistics center determines if the commodity truck has reached the client end through the position signal.

Step 407: If the commodity truck has reached the client end, the cargo truck is directed to the client end.

Step 408: generating a signal as to finished transportation to the logistics center through a specific manner to the logistics center by the control computer. In this step, a driver of the cargo truck inputs the signal as to finished transportation into the control computer when the transported commodities is directed to the client terminal and the signal as to finished transportation is transmitted to the logistics center by the control computer through a specific manner. Alternatively, the control computer may transmit the temperature signal, position signal and identification code to the telecommunications company through a specific manner and then the telecommunications company forwards the temperature signal, position signal and identification code to the logistics center through a specific manner or the Internet, as that undertaken in Step 404. The specific manner may be GPS transmission, universal grouping wireless business transmission, wireless transmission, and 3G wireless communications transmission.

Step 409: Displaying information as to finished transportation by the logistics center. In this step, the logistics center records a dealing time and commodities types associated with the transported commodities for account management and future reference after receiving the signal as to finished transportation.

Step 410: returning of the cargo truck to the logistics center. In this step, the cargo truck returns to the logistics center after all the transported commodities have reached the corresponding client terminals and awaits a next distribution task.

In the temperature tracking and monitoring system of commodities transportation of this invention, the RFID tag is preferably an active RFID tag. The delivery unit further comprises an alarm device coupled to the control computer. When the detected temperature by the RFID tag is lower than a predetermined temperature, the alarm device may display an alarm frame or set forth an alarm sound so that the cargo truck driver and/or the logistics center may be notified with the detected temperature.

Therefore, with a plurality of glove compartments, the purpose of multi-temperature commodities distribution of the invention may be achieved. Further, the logistics center may monitor glove compartments of different temperatures in the cargo truck and position of the cargo truck. As such, rate of progress of the commodities transportation and conditions of the commodities in the commodities transportation may be actually acquired and the purpose of logistics management may be efficiently achieved.

Incidentally, the multi-temperature commodities tracking and monitoring system may not only be used in commodities distribution but may be also used in commodities pick-up. That is, when a client requires a commodities delivery, an empty cargo truck is assigned to pick up the commodities intended to be delivered at the client terminal. Through the same tracking and monitoring manner as described above, conditions of the commodities picked up at the client terminal may also be acquired.

What is claimed is:

1. A temperature tracking and monitoring system used for commodities transportation, comprising
   a deliver unit, comprising:
   a transportation means for transporting;
   at least a glove compartment disposed in the transportation means;
   a RFID tag disposed in the glove compartment and adapted to transmit an identification code, wherein the RFID tag is capable of transforming a temperature into a temperature signal and transmitting the temperature signal; and
   a RFID reader disposed in the transportation means and capable of reading the temperature signal and the identification code;

a control computer coupled communicatively with the RFID reader so as to receive the temperature signal and the identification code, adapted to transmit a positioning request signal and receive real-time position data, transform the real-time position data into a position signal and transmitting the position signal, the temperature signal and the identification code in a specific manner; and a monitor and control unit, comprising:

a positioning device adapted to transmit the real-time position data to the control computer in response to the positioning request signal; and a logistics center adapted to receive the position signal, the temperature signal and the identification code so as to acquire information of a position and a temperature of the glove compartment.

2. The system as recited in claim 1, wherein the monitor and control unit further comprises a telecommunications company which is capable of receiving the position signal, the temperature signal and the identification code transmitted from the control computer and forwarding the position signal, the temperature signal and the identification code to the logistics center.

3. The system as recited in claim 2, wherein the position signal, the temperature signal and the identification code are forwarded to the logistics center through the Internet.

4. The fixation device as recited in claim 1, wherein the RFID tag is an active RFID tag.

5. The fixation device as recited in claim 1, wherein the specific manner is selected from a group consisting of GPS transmission, universal grouping wireless business transmission, wireless transmission, and 3G wireless communications transmission.

6. The system as recited in claim 1, wherein the positioning device is a global positioning system satellite.

7. The system as recited in claim 1, wherein the delivery unit further comprises an alarm device coupled communicatively to the control computer and displaying a frame or setting forth an alarm sound.

8. A fixation device for a glove compartment used for a temperature tracking and monitoring system for commodities transportation, comprising:

an upper lid being hollow and provided with a plurality of through-holes and an end of the upper lid being closed and another end of the upper lid provided with a first tenon and a first rotation fixation bolt capable of being coupled to the glove compartment; and a lower lid being hollow and provided with a plurality of through-holes and an end of the lower lid being closed and another end of the lower lid provided with a second tenon capable of being fastened closely to the first tenon and a second rotation fixation bolt being capable of being coupled to the glove compartment, wherein the fixation device is fixed into the glove compartment through the coupling of the first and second rotation fixation bolts and the glove compartment.

9. The fixation device as recited in claim 8, wherein the transportation means further comprises a RFID tag disposed therein.

10. A method of tracking and monitoring in a cargo truck, multi-temperature commodities, comprising the steps of:

(a) providing a deliver unit, a control computer and a monitor and control unit wherein the deliver unit includes a transportation means for transporting, a glove compartment, a RFID tag with an identification code and a RFID reader and the monitor and control unit includes a positioning device and a logistics center;

(b) placing the RFID tag into the glove compartment and then placing the glove compartment, the RFID reader and the control computer into the transportation means and at the same time connecting communicatively the control computer with the RFID reader;

(c) initializing the control computer and the RFID reader;

(d) starting off the cargo truck and beginning a distribution task from the logistics center;

(e) detecting a temperature by the RFID tag instructed by the control computer through the RFID reader, transforming the detected temperature into a temperature signal, transmitting the temperature signal, reading the identification code through the RFID reader by the control computer and at the same time transmitting a positioning request signal to the positioning device by the control computer, transmitting real-time position data in response by the positioning device to the control computer and transforming the real-time position data into a position signal;

(f) transmitting the temperature signal, the position signal and the identification signal in a specific manner to the logistics center; and (g) displaying the temperature signal, the position signal and the identification code by the logistics center so that real-time conditions of the transportation means are acquired.

11. The method as recited in claim 10, further comprising the steps of:

(h) determining if the transportation means has reached a client terminal by the logistics center;

(i) and if yes, directing a transported commodity to a client terminal, repeating the step (e);

(j) generating a signal as to finished transportation and transmitting the signal as to finished transportation to the logistics center in a specific manner;

(k) displaying information as to finished transportation by the logistics center; and (l) returning of the cargo truck to the logistics center.

12. The method as recited in claim 10, wherein the monitor and control unit further comprises a telecommunications company which is capable of receiving the position signal, the temperature signal and the identification code transmitted from the control computer and forwarding the position signal, the temperature signal and the identification code to the logistics center.

13. The method as recited in claim 12, wherein the position signal, the temperature signal and the identification code are forwarded to the logistics center through the Internet.

14. The method as recited in claim 10, wherein the glove compartment further comprises:

an upper lid being hollow and provided with a plurality of through-holes and an end of the upper lid being closed and another end of the upper lid provided with a first tenon and a first rotation fixation bolt capable of being coupled to the glove compartment; and a lower lid being hollow and provided with a plurality of through-holes and an end of the lower lid being closed and another end of the lower lid provided with a second tenon capable of being fastened closely to the first tenon and a second rotation fixation bolt being capable of being coupled to the glove compartment, wherein the fixation device is fixed into the glove compartment through the coupling of the first and second rotation fixation bolts and the glove compartment.

15. The method as recited in claim 14, wherein the transportation means further comprises a RFID tag disposed therein.

16. The method as recited in claim 10, wherein the RFID tag is an active RFID tag.

17. The method as recited in claim 10, wherein the specific manner is selected from a group consisting of GPS transmission, universal grouping wireless business transmission, wireless transmission, and 3G wireless communications transmission.

18. The method as recited in claim 10, wherein the positioning device is a global positioning system satellite.

19. The method as recited in claim 10, wherein the delivery unit further comprises an alarm device coupled communicatively to the control computer and displaying a frame or setting forth an alarm sound.

20. The method as recited in claim 10, wherein the RFID tag detects the temperature based on a specific time interval.

* * * * *